(12) United States Patent
Beard

(10) Patent No.: US 10,215,538 B2
(45) Date of Patent: *Feb. 26, 2019

(54) BALLISTIC RESISTANT SHEETS, ARTICLES COMPRISING SUCH SHEETS AND METHODS OF MAKING THE SAME

(71) Applicant: DSM IP ASSETS B.V., Heerlen (NL)

(72) Inventor: Andrew James Beard, Stanley, NC (US)

(73) Assignee: DSM IP ASSETS B.V., Heerlen (NL)

( * ) Notice: Subject to any disclaimer, the term of this patent is extended or adjusted under 35 U.S.C. 154(b) by 361 days.

This patent is subject to a terminal disclaimer.

(21) Appl. No.: 14/910,418

(22) PCT Filed: Aug. 7, 2014

(86) PCT No.: PCT/EP2014/067021
§ 371 (c)(1),
(2) Date: Feb. 5, 2016

(87) PCT Pub. No.: WO2015/018909
PCT Pub. Date: Feb. 12, 2015

(65) Prior Publication Data
US 2016/0178327 A1  Jun. 23, 2016

Related U.S. Application Data

(60) Provisional application No. 61/863,127, filed on Aug. 7, 2013.

(30) Foreign Application Priority Data

Mar. 17, 2014 (EP) .................................... 14160332

(51) Int. Cl.
| | | |
|---|---|---|
| *F41H 5/04* | (2006.01) | |
| *B29C 70/42* | (2006.01) | |
| *B29C 70/20* | (2006.01) | |
| *B29L 31/48* | (2006.01) | |

(52) U.S. Cl.
CPC ......... *F41H 5/0471* (2013.01); *B29C 70/202* (2013.01); *B29C 70/207* (2013.01);
(Continued)

(58) Field of Classification Search
CPC ..... B29C 70/202; B29C 70/207; B29C 70/42; B29L 2031/4821; B29K 2821/00; F41H 5/0471
See application file for complete search history.

(56) References Cited

U.S. PATENT DOCUMENTS

| | | |
|---|---|---|
| 4,623,574 A | 11/1986 | Harpell et al. |
| 5,766,725 A | 6/1998 | Hogenboom et al. |

(Continued)

FOREIGN PATENT DOCUMENTS

| | | |
|---|---|---|
| GB | 2 042 414 | 9/1980 |
| WO | WO 01/73173 | 10/2001 |

(Continued)

OTHER PUBLICATIONS

International Search Report for PCT/EP2014/067021, dated Oct. 31, 2014, 3 pages.

*Primary Examiner* — Arti Singh-Pandey
(74) *Attorney, Agent, or Firm* — Nixon & Vanderhye P.C.

(57) ABSTRACT

Ballistic resistant sheets (12), articles (10) comprising such sheets and methods of making the same are provided. The embodiments are especially adapted to facilitate the manufacture of curved ballistic resistant articles (e.g. curved ballistic resistant armor, helmets and the like). In preferred forms, the ballistic resistant sheets are a multi-monolayer construction including a core layer (12-1) formed of at least one first monolayer having first unidirectionally oriented reinforcing fibers and an elastomeric matrix material which is sandwiched between respective face layers (12-2) each formed of at least one second monolayer having second (Continued)

unidirectionally oriented reinforcing fibers and a non-elastomeric matrix material.

15 Claims, 2 Drawing Sheets

(52) U.S. Cl.
CPC .......... *B29C 70/42* (2013.01); *B29K 2821/00* (2013.01); *B29L 2031/4821* (2013.01)

(56) References Cited

U.S. PATENT DOCUMENTS

| | | |
|---|---|---|
| 7,527,854 B2 | 5/2009 | Jacobs et al. |
| 7,976,932 B1* | 7/2011 | Lyons ................. B32B 5/12 139/383 R |
| 2007/0163023 A1* | 7/2007 | Steeman ............... B32B 5/02 2/2.5 |
| 2010/0064404 A1 | 3/2010 | Es Van et al. |
| 2012/0156452 A1* | 6/2012 | Wilenski ............... B32B 5/14 428/212 |
| 2012/0244769 A1 | 9/2012 | Ardiff et al. |
| 2018/0017359 A1* | 1/2018 | Li ...................... F41H 5/0485 |

FOREIGN PATENT DOCUMENTS

| | | |
|---|---|---|
| WO | WO 2008/077605 | 7/2008 |
| WO | 2012/150164 | 11/2012 |
| WO | WO 2012/150169 | 11/2012 |

\* cited by examiner

BALLISTIC RESISTANT SHEETS, ARTICLES COMPRISING SUCH SHEETS AND METHODS OF MAKING THE SAME

This application is the U.S. national phase of International Application No. PCT/EP2014/067021 filed 7 Aug. 2014, which designated the U.S. and claims priority to EP Patent Application No. 14160332.4 filed 17 Mar. 2014, and claims the benefit of U.S. Application No. 61/863,127 filed 7 Aug. 2013, the entire contents of each of which are hereby incorporated by reference.

FIELD

The disclosed embodiments herein relate to ballistic resistant sheets, articles comprising such sheets and methods of making the same. In the art the ballistic resistant sheets according to the invention often are referred to as hybrid ballistic resistant sheets. The embodiments are especially adapted to facilitate the manufacture of antiballistic articles, preferably curved antiballistic articles (e.g. curved ballistic resistant armor, helmets, radomes and the like). In preferred forms, the ballistic resistant sheets are a multi-monolayer construction including a core layer formed of at least one, preferably at least two, first monolayer comprised of first unidirectionally oriented reinforcing fibers and an elastomeric matrix material, which core layer is sandwiched between respective face layers, each face layer formed of at least one, preferably at least two, second monolayer comprised of second unidirectionally oriented reinforcing fibers and optionally a non-elastomeric matrix material.

BACKGROUND AND SUMMARY

Ballistic resistant sheets comprising multiple monolayers containing unidirectionally (UD) oriented reinforcing fibers with a matrix material are known, e.g., from U.S. Pat. Nos. 4,623,574, 5,766,725 and 7,527,854 and U.S. Patent Application Publication No. 2010/0064404 (the entire contents of each being expressly incorporated hereinto by reference).

A ballistic resistant sheet is furthermore known from WO2012/150169. In this publication a two-layer hybrid structure is disclosed comprised of a first layer ('first stack') comprising laminates with a first kind of yarn, and of a second layer ('second stack') comprising laminates with a second kind of yarn. The first kind of yarn and the second kin of yarn differ in linear density or thickness. Some matrix material are mentioned at page 3, including elastomer and epoxy resin, however no teaching on the use of these matrix materials are given. In the example the same matrix material, styrene-isoprene-styrene block copolymer, is used for all layers, comprising different types of aramid fibers. There is no mention of a 3 layer fiber based hybrid structure with tailored use of different matrix material per layer.

A ballistic resistant sheet is known from WO2008/077605. This publication discloses the manufacture of ballistic resistant sheets, whereby the ballistic resistant sheet is built up from monolayers with unidirectional polyethylene fibers and a matrix material. The matrix material disclosed in the example is a styrene-isoprene-styrene block copolymer. Furthermore a ballistic resistant moulded article is disclosed based on compressed ballistic resistant sheets combined with a ceramic strike face, optionally with a metal layer between the ceramic strike face and the ballistic resistant sheet. There is no mention of a 3 layer fiber based hybrid structure with tailored use of different matrix material per layer.

A ballistic resistant sheet is known from US2012/0244769. This publication discloses a method of producing a composite with a non-uniformly distributed matrix material. Example 1 discloses an aramid based unidirectional composite material with inhomogeneous distribution of a polyurethane-based matrix material, whereby a scrim material is bonded to the resin poor surface of the composite. This composite together with the same composite, however without the said scrim, are combined in a mould and compressed to form a shaped article. There is no mention of a 3 layer fiber based hybrid structure with tailored use of different matrix material per layer.

Preferably, each monolayer in the multi-monolayer sheet contains the UD oriented reinforcing fibers with the fiber direction in each monolayer being rotated with respect to the fiber direction in an adjacent monolayer. Such a ballistic resistant sheet is very suitable for use in compressed or moulded ballistic resistant articles such as panels and especially curved panels and articles (e.g., inserts, helmets, radomes). An alternative use of the ballistic resistant sheets of the embodiments disclosed herein, being a multi-monolayer construction including a core layer formed of at least one, preferably at least two, first monolayer comprised of first unidirectionally oriented reinforcing fibers and an elastomeric matrix material which is sandwiched between respective face layers, relates to soft ballistic articles, such as bullet-resistant vests.

There is continuous drive towards improved ballistic resistant articles, including moulded articles that enables the manufacture of compressed panels or ballistic resistant moulded articles with improved mouldability. Improved mouldability means that upon moulding of a ballistic resistant article, especially a curved ballistic resistant article, comprising several ballistic resistant sheets, a homogeneous product is obtained (i.e., a product having a visually identifiable homogeneity by a reduced or even absence of an inhomogeneous drape of the ballistic resistant sheets in the article after moulding). Additionally these sheets and articles should have a good, and preferably improved, ballistic resistance.

It is towards providing such ballistic resistant sheets and moulded articles therefrom that the present invention is directed.

In general, the embodiments disclosed herein relate to hybrid ballistic resistant sheets, articles which comprise such sheets and methods of making the same. According to some embodiments, the ballistic resistant sheets will include a core layer and face layers joined to respective opposing surfaces of the core layer. The core layer may include at least one, preferably at least two, first monolayer comprised of first unidirectionally (UD) oriented fibers and an elastomeric matrix material, while each of the face layers may include at least one, preferably at least two, second monolayer comprised of second UD oriented fibers and a non-elastomeric matrix material.

The first and second UD fibers may be the same or different from one another and may be selected from organic fibers and inorganic fibers. For example, at least one of the first and second UD fibers may be formed of inorganic fibers selected from the group consisting of glass fibers, carbon fibers and ceramic fibers. Alternatively or additionally, at least one of the first and second UD fibers may be formed of organic fibers selected from the group consisting of aromatic polyamide fibers, liquid crystalline polymer and ladder-like polymer fibers polyolefin fibers, polyvinyl alcohol fibers, and polyacrylonitriles fibers. According to some embodiments, at least one of the first and second UD fibers are formed of ultra high molecular weight (UHMW) polyethylene fibers, polybenzimidazole fibers, poly(1,4-phenylene-2,6-benzobisoxazole fibers and/or poly(2,6-diimidazo[4,5-b-4',5'-e]pyridinylene-1,4-(2,5-dihydroxy)phenylene) fibers. In a particularly preferred embodiment the first and/or second UD fibers are formed of ultra high molecular weight (UHMW) polyethylene fibers. Preferably the UHMW polyethylene fibers are made from ultra high molecular weight polyethylene with an Intrinsic Viscosity of at least 4 dl/g, preferably of at least 6 dl/g, more preferably of at least 8 dl/g. The Intrinsic Viscosity is determined according to ASTM D1601 at 135° C. in decalin, the dissolution time being 16 hours, with DBPC as anti-oxidant in an amount of 2 g/l solution, by extrapolating the viscosity as measured at different concentrations to zero concentration.

The matrix materials of the core and face layers may comprise at most 20 mass % of the total mass of the monolayer(s).

The elastomeric matrix material employed in at least one of the first monolayers of the core will typically have a tensile modulus (i.e. secant modulus measured at about 23° C. according to ISO 527 at a strain of 100%) of less than about 3 MPa, sometimes less than about 2.5 MPa, for example less than about 2.0 MPa. This would lead to a further improved ballistic resistant sheet. According to some embodiments, the elastomeric matrix material may have a tensile modulus of less than about 1.5.

The elastomeric matrix may be comprised of at least one material selected from the group consisting of polybutadiene, polyisoprene, natural rubber, ethylene-propylene copolymers, ethylene-propylene-diene terpolymers, polysulfide polymers, polyurethane, polyurethane elastomers, modified polyolefins, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, thermoplastic elastomers, and ethylene copolymers. According to some embodiments, the elastomeric matrix material may comprise a block copolymer of a conjugated diene and a vinyl aromatic monomer. In this regard, the conjugated diene may be butadiene or isoprene while the vinyl aromatic monomer may be styrene, vinyl toluene or t-butyl styrene.

The non-elastomeric matrix material employed in at least one of the second monolayers of the face layers will typically have a tensile modulus (i.e. secant modulus measured at about 23° C. according to ISO 527 at a strain of 100%) of at least 3 MPa or greater, for example a tensile modulus of at least about 5 MPa or greater, e.g., up to about 500 MPa.

The non-elastomeric matrix material may be at least one selected from the group consisting of acrylates, polyurethanes, polyolefins—preferably polyethylene, modified polyolefins and ethylene vinyl acetate.

A ballistic resistant article may be provided which comprises consolidating the ballistic resistant sheet. In some embodiments, such a ballistic resistant article may exhibit a V50 of at least about 750 m/s (2470 fps) according to Stanag 2920 using a 7.62×39 mm mild steel core bullet.

The ballistic resistant sheets may be consolidated under an elevated pressure of at least about 16.5 MPa and an elevated temperature of preferably at least 10° C. below a temperature at which the fiber melts or at which mechanical properties of the first and second UD fibers deteriorates. Some embodiments will consolidate the sheets at an elevated pressure of at least about 20 MPa, for example at least about 25 MPa. The elevated pressure employed for sheet consolidation may be between about 16.5 MPa up to at least about 350 MPa, for example between 16.5 MPa to about 90 MPa, e.g., about 45 MPa.

BRIEF DESCRIPTION OF THE DRAWINGS

These and other aspects of the present invention will be further elucidated in the following detailed description of presently preferred exemplary embodiments thereof, wherein.

DETAILED DESCRIPTION

Figure 1:
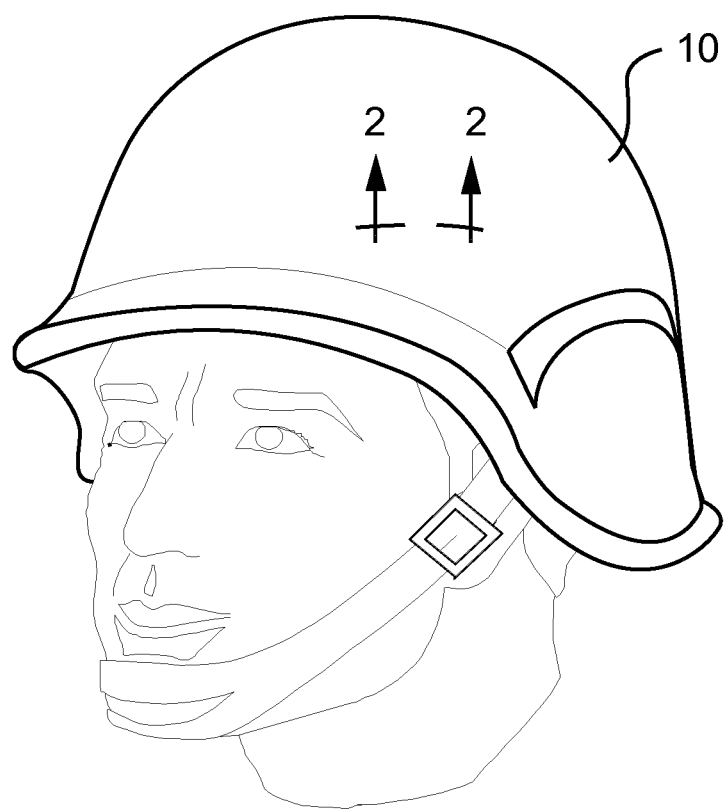
FIG. 1 is a schematic view of a moulded article, i.e., a protective ballistic resistant helmet, that may be fabricated from the consolidated hybrid ballistic resistant sheets of the embodiments described herein.
Figure 2:
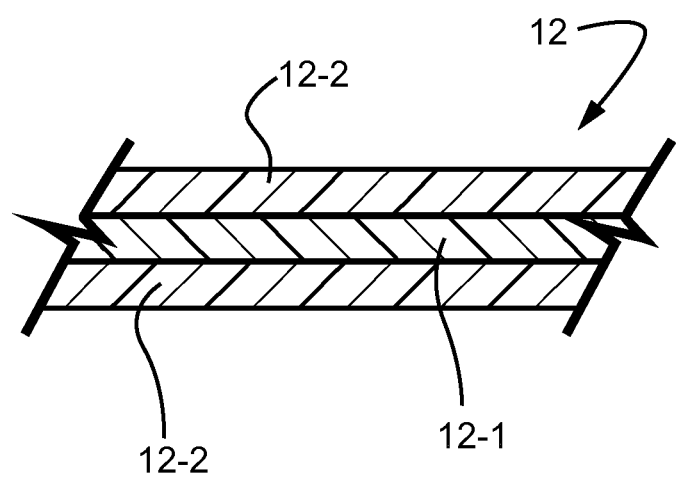
FIG. 2 is a schematic cross-sectional view of the consolidated hybrid ballistic resistant sheets of an embodiment described herein employed in the helmet of FIG. 1 as taken along lines 2-2 therein.

The ballistic resistant sheets when consolidated under pressure to provide moulded or mouldable panels may be formed into a variety of articles exhibiting ballistic resistant properties. For example, the consolidated panels may be shaped by suitable moulding to provide ballistic resistant helmets as shown schematically by reference numeral 10 in FIG. 1. The helmet 10 is preferably conformably shaped to a wearer's head and includes a ballistic resistant shell formed of a consolidated ballistic resistant sheet 12 (sometimes references as a "panel" hereinafter"). Generally, the consolidated ballistic resistant sheet 12 includes at least one core layer 12-1 and outer layers, hereinafter referred to as face layers, numbered 12-2, therewith forming a 3 layer hybrid structure of 'face layer/core layer/face layer'. One of these outer layers, or face layers, 12-2 will typically face the threat or impact, in the art referred to as strike face, while the other outer layer 12-2 will be most remote from the threat, in the art referred to as back face. The core layer and face layers may be built up from monolayers or from pre-assembled sets of monolayers, herein referred to as sub-sheets. Such sub-sheets may be commercially available through e.g. DSM Dyneema. Each of the outer layers may be identical or have a different structure and/or composition The ballistic resistant sheet according to the embodiments of the invention may suitably be piled up and compressed to form a ballistic resistant moulded article. With ballistic resistant moulded articles are meant shaped parts, comprising at least one, preferably at least two, ballistic resistant sheets according to the invention, which may be used as, for example, a panel for use in e.g., a vehicle, especially a curved panel, a hard insert e.g., for use in protective clothing and bullet resistant vests, helmets and the like. All these applications offer protection against ballistic impacts such as bullets and ballistic fragments.

Figure 3:
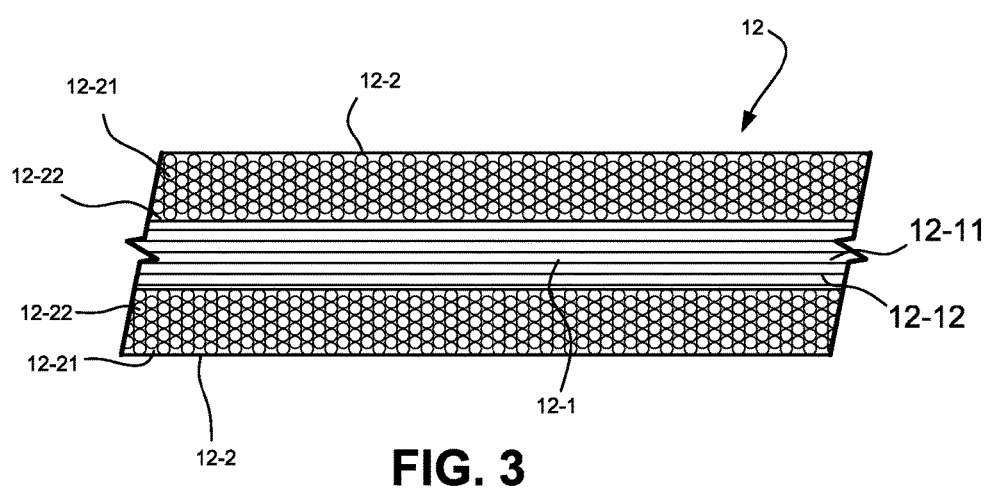
FIG. 3 is a schematic cross-sectional view of another embodiment described herein.

As is shown in FIG. 3, each of the layers 12-1 (core layer) and 12-2 (face layer) may be formed of one, preferably two, or more respective monolayers comprised of UD oriented reinforcing fibers 12-11, 12-21 in a matrix material 12-12, 12, 21, respectively, as will be described in greater detail below. Moreover the direction of the UD fibers in one monolayer will be oriented at an angle (biased) with respect to the direction of UD fibers in adjacent monolayers between an angle of greater than 0° up to and including 90° for example between 10° and 80° or in some embodiments between 45° and 90°. Some embodiments will have the UD fiber directions in adjacent monolayers biased at an angle of about 90°

The layers 12-1 and 12-2 are preferably directly bonded to one another. In one of such embodiments, there are preferably no additional material layers between layer 12-1 and the layers 12-2. However, if desired one or more intermediate layers may be interposed between the layer 12-1 and the layers 12-2 in order to enhance bonding therebetween and/or to provide desired performance benefits. Such layer would improve multi-hit performance. Thus, for example, an adhesive layer may be provided if desired between the layer 12-1 and each of the layers 12-2. Adhesive layers are well known in the art and may comprise e.g. a scrim or film layer. Such adhesive layers may suitably be made of various materials including polyolefins and modified polyolefins, and specifically polyethylenes and modified polyethelene.

In one preferred embodiment, both strike face and back face layers 12-2 are identical in construction, type of fiber and matrix material and amount. In another preferred embodiment, both strike face and back face layers 12-2 differ—within the boundaries given for the invention—in construction, type of fiber and matrix material and amount.

A preferred embodiment of the present invention relates to a ballistic resistant sheet in the form of a three-layer hybrid structure, consisting of a core layer and face layers joined to respective opposing surfaces of the core layer, wherein the core layer comprises at least two first monolayers comprised of first unidirectionally (UD) oriented fibers and an elastomeric matrix material, and wherein each of the face layers comprise at least two second monolayers comprised of second UD oriented fibers and optionally a non-elastomeric matrix material.

In the present invention the percentage of face layers and core layer in ballistic resistant sheet may be chosen upon desire as long as three layers remain present. Generally a face layer is present in an amount of at least 5 mass %. Typically a face layers constitutes less than 45 mass % of the ballistic resistant sheet. Preferably a face layer is present in an amount of between 10 and 40 mass %. If in such a case the other face layer is present in the same amount, the core layer may be present in an amount of between 80 and 20 mass %. In a further preferred range a face layer is present in an amount of between 20 and 30 mass %.

A. UD REINFORCEMENT FIBERS

The fibers in the ballistic resistant sheet of the invention will preferably have a tensile strength of at least 1.5 GPa, more preferably at least 2.0 GPa, even more preferably at least 2.5 GPa and most preferably at least 3.0 GPa, for example up to about 7.0 GPa. Some embodiments will employ fibers having a tensile strength of between about 3.5 and about 4.5 GPa. According to some embodiments, the fibers will exhibit a tensile strength of between 3.6 and 4.3 GPa, more preferably between 3.7 and 4.1 GPa or most preferably between 3.75 and 4.0 GPa. This tensile strength is determined (at 25° C.) on multifilament yarns as specified in ASTM D885M, using a nominal gauge length of the fiber of 500 mm, and a crosshead speed of 50%/min.

The fibers may be inorganic or organic fibers. Suitable inorganic fibers are, for example, glass fibers, carbon fibers and ceramic fibers.

Suitable organic fibers with such a high tensile strength are, for example, aromatic polyamide fibers (also often referred to as aramid fibers), especially poly(p-phenylene teraphthalamide), liquid crystalline polymer and ladder-like polymer fibers such as polybenzimidazoles or polybenzoxazoles, especially poly(1,4-phenylene-2,6-benzobisoxazole) (PBO), or poly(2,6-diimidazo[4,5-b-4',5'-e]pyridinylene-1, 4-(2,5-dihydroxy)phenylene) (PIPD; also referred to as M5) and fibers of, for example, polyolefins, polyvinyl alcohol, and polyacrylonitrile which are highly oriented, such as obtained, for example, by a gel spinning process. Highly oriented polyolefin, aramid, PBO and PIPD fibers, or a combination of at least two thereof are preferably employed.

The core layer may additionally or alternatively comprise monolayers containing unidirectionally (UD) oriented fibers as disclosed more completely, for example, in U.S. Pat. Nos. 5,766,725 and 7,527,854 and U.S. Patent Application Publication No. 2010/0064404 (the entire contents of each being expressly incorporated hereinto by reference). High performance polyethylene fibers or highly drawn polyethylene fibers consisting of polyethylene filaments that have been prepared by a gel spinning process, such as described, for example, in GB 2042414 A or WO 01/73173 (incorporated by reference herein), are even more preferably used.

A further preferred embodiment of the present invention relates to a ballistic resistant sheet comprising a core layer and face layers joined to respective opposing surfaces of the core layer, wherein the core layer comprises at least two first monolayers comprised of first unidirectionally (UD) oriented fibers and an elastomeric matrix material, and wherein one of the face layers comprise at least two second monolayers comprised of second UD oriented fibers and an optional non-elastomeric matrix material, wherein another of the face layers comprise at least one second monolayer comprised of second fibers and an optional non-elastomeric matrix material.

In a preferred embodiment of the invention, the fibers in the core or face layers may replaced by tapes. In another preferred embodiment, the fibers in at least one face layer may be in the shape of a tape. In yet another preferred embodiment the fibers in the strike face layer may be replaced by tapes.

In yet another preferred embodiment of the present invention, the tapes in at least both face layers are arranged in a woven fashion optionally with matrix material, and whereby the core layer comprises at least two first monolayers comprised of first unidirectionally (UD) oriented fibers and an elastomeric matrix material.

A tape is an elongated object with its length being a multitude of its width or thickness. Typically the thickness of a tape is at least 10 micrometer, preferably at least 20 micrometer. The thickness of a tape is generally less than 200 micrometers, preferably less than 150 micrometers, even more preferably less than 100 micrometers. Width of such a tape is preferably at least 1 mm, preferably at least 5 mm, more preferably at least 15 mm, even more preferably at least 25 mm and most preferably at least 50 mm. In principle there are no limitations to the maximum width of the tape. Generally the width will be chosen less than 2000 mm, preferably less than 1500 mm, even more preferably less than 1000 mm, preferably less than 500 mm, and most preferably less than 250 mm. The tensile strength of the tape is preferably at least 1.5 GPa, more preferably at least 2.0 GPa and most preferably at least 2.5 GPa. Tensile strength is measured at 25° C. on tapes of a width of 20 mm as specified in ASTM D882, using a nominal gauge length of the tape of 440 mm, a crosshead speed of 50 mm/min. The tape is preferably based on a polyolefin polymer or copolymer, such as polypropylene or polyethylene. A preferred type of polyethylene is the earlier described UHMWPE.

The UD fibers, or tapes as mentioned for specific embodiments, forming the monolayers of the core layer 12-1 and preferably also the face layers 12-2 are bound together by means of a matrix material which encloses the fibers in their entirety or in part, such that the structure of the mono-layer is retained during handling and making of preformed sheets. The matrix material can be applied in various forms and ways, for example as a film between monolayers of fiber, as a transverse bonding strip between the unidirectionally aligned fibers or as transverse fibers (transverse with respect to the unidirectional fibers), or by impregnating and/or embedding the fibers with a matrix material in a liquid form.

B. MATRIX MATERIALS

The term matrix material refers to a material that binds or holds the fibers together and may enclose the fibers in their entirety or in part, such that the structure of the mono-layer is retained during handling and making of preformed sheets. The matrix material can have been applied in various forms and ways; for example as a film between monolayers of fiber, as a transverse bonding strip between the unidirectionally aligned fibers or as transverse fibers (transverse with respect to the unidirectional fibers), or by impregnating and/or embedding the fibers with a matrix material.

The amount of matrix material in the monolayer is typically at most 20 mass %. This results in a good combination of ballistic performance and mouldability. Preferably the amount of matrix material in the monolayer is at most 18.5 mass %; more preferably at most 17.5 mass % so as to result in an even better combination of ballistic performance and mouldability. The amount of matrix material in the monolayer of some embodiments may be at most 16 mass %. Preferably the amount of matrix material of the core layer is at least 1 mass % of the total mass of the monolayer(s), more preferably the matrix materials of the core layer is at least 3 mass % of the total mass of the monolayer(s), most preferably the matrix materials of the core layer is at least 5 mass % of the total mass of the monolayer(s).

The amount of matrix materials of the face layers may be 0 mass %, but is preferably at least 1 mass % of the total mass of the monolayer(s). More preferably the matrix materials of the face layers is at least 3 mass % of the total mass of the monolayer(s), most preferably the matrix materials of the face layers is at least 5 mass % of the total mass of the monolayer(s).

The weight, or areal density, of the monolayer including the weight of the fibers and matrix material is typically at least 25 g/m$^2$, sometimes between 30 and 300 g/m$^2$, such as between 30 and 280 g/m$^2$. According to some embodiments, the weight or areal density of the monolayer is between 40 and 150 g/m$^2$.

For the manufacture of the ballistic resistant sheet according to the invention, the unidirectionally reinforcing fibers are impregnated with the matrix material for instance by applying one or more plastic films to the top, bottom or both sides of the plane of the fibers and then passing these, together with the fibers, through heated pressure rolls. Preferably, however, the fibers, after being oriented in parallel fashion in one plane, are coated or at least contacted with an amount of a liquid substance containing the matrix material. The advantage of this is that more rapid and better impregnation of the fibers is achieved. The liquid substance may be for example a solution, a dispersion or a melt of the plastic. If a solution or a dispersion of the plastic is used in the manufacture of the monolayer, the process also comprises evaporating the solvent or dispersant. In this way a monolayer is obtained. Subsequently at least two of such monolayers are stacked in such a way that the fiber direction in each monolayer being rotated with respect to the fiber direction in an adjacent monolayer. Finally the stacked monolayers are given a treatment so that they are linked or attached to one another, e.g., to obtain a sub-sheet. A suitable treatment may be pressing or laminating the stack at a temperature sufficiently high to obtain adhesion. Generally a higher temperature will give a better adhesion. The adhesion may be further increased by applying some pressure. Suitable pressure and temperature can be found by some routine experimentation. In the event of high performance polyethylene fibers such temperature may not exceed 150° C., preferably may not exceed 140° C., and more preferably may not exceed 130° C.

(i) Elastomeric Matrix Materials

The matrix material of the monolayer(s) forming the core layer 12-1 is an elastomeric matrix material. According to some preferred embodiments, the elastomeric matrix material is a polymeric material, preferably an elastomeric polymeric material having a tensile modulus (i.e. secant modulus measured at about 23° C. according to ISO 527 at a strain of 100%) of less than 3 MPa (435.1 psi). According to certain embodiments, the tensile modulus of the elastomeric matrix material is less than about 2.5 MPa (362.5 psi), and still sometimes less than about 2.0 MPa (290.1 psi). Some embodiments may beneficially include elastomeric matrix material in the monolayers of layer 12-1 having a tensile modulus of about 1.5 MPa (217.5 psi) or less. The glass transition temperature (Tg) of the elastomer of the elastomeric matrix material (as evidenced by a sudden drop in the ductility and elasticity of the material) is less than about 0° C. Preferably, the Tg of the elastomer is less than about −40° C., and more preferably is less than about −50° C. The elastomer also has an elongation to break of at least about 50%. Preferably, the elongation to break is at least about 100%, and more preferably, it is at least about 300% for improved performance. In a special embodiment the elongation to break is about 300%.

A wide variety of elastomeric materials and formulations may be utilized in the embodiments of the invention. The essential requirement is that the elastomeric matrix materials have the appropriately low moduli as mentioned here above. Representative examples of suitable elastomers of the elastomeric material matrix have their structures, properties, formulations together with crosslinking procedures, if need of crosslinking would be, summarized in the Encyclopedia of Polymer Science, Volume 5 in the section Elastomers Synthetic (John Wiley & Sons Inc., 1964), incorporated by reference herein. For example, elastomers that may be employed for the elastomeric matrix material include polybutadiene, polyisoprene, natural rubber, ethylene-propylene copolymers, ethylene-propylene-diene terpolymers, polysulfide polymers, polyurethane, polyurethane elastomers, modified polyolefins, chlorosulfonated polyethylene, polychloroprene, plasticized polyvinylchloride using dioctyl phthalate or other plasticizers well known in the art, butadiene acrylonitrile elastomers, poly(isobutylene-co-isoprene), polyacrylates, polyesters, polyethers, fluoroelastomers, silicone elastomers, thermoplastic elastomers, plastomers and copolymers of ethylene.

Particularly useful elastomers are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R\text{-}(BA)_x$ (x=3-150); wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Most preferably, the elastomeric matrix material consists essentially of at least one of the above-mentioned elastomers and excludes any material that would adversely affect the moduli. The elastomeric matrix material may also include fillers such as carbon black, silica, and the like, and may be extended with oils and vulcanized by sulfur, peroxide, metal oxide, or radiation cure systems using methods well known to rubber technologists. Blends of different elastomeric materials may be used together or one or more elastomer materials may be blended with one or more thermoplastics. In every instance, the tensile modulus of the elastomeric matrix material should not exceed the values mentioned previously.

(ii) Non-Elastomeric Matrix Materials

The non-elastomeric matrix materials employed in the monolayers comprising the face layers 12-2 preferably have a tensile modulus (i.e. secant modulus measured according to ISO 527 at a strain of 100% and at a temperature of about 23° C.) of at least 3 MPa (435.1 psi). In some embodiments, the tensile modulus of the non-elastomeric matrix material will be at least about 5 MPa (725.2 psi). Generally, the non-elastomeric matrix material will have a tensile modulus of less than about 500 MPa (72519 psi), e.g., less than about 200 MPa (29008 psi).

Particularly suitable are those non-elastomeric matrix materials that can be applied as a dispersion in water. Examples of suitable thermoplastic materials that may be employed as the non-elastomeric matrix material include (poly)acrylates, polyurethanes, polyolefins—preferably polyethylene, modified polyolefins and (poly)ethylene vinyl acetate. Preferably, the non-elastomeric matrix material contains a polyurethane. More preferably, the polyurethane is a polyetherurethane that is based on a polyetherdiol. Such a polyurethane provides good performance over a wide temperature range. In some embodiments, the polyurethane or polyetherurethane is based on aliphatic diisocyanates as this further improves product performance.

C. MANUFACTURE

For the manufacture of the ballistic resistant sheets according to the embodiments of the invention, the unidirectionally reinforcing fibers are impregnated with the respective matrix material, for instance by applying one or more plastic films of the material to the top, bottom or both sides of the plane of the fibers and then passing the films, together with the fibers, through heated pressure rolls.

In some cases, however, the fibers, after being oriented in parallel fashion in one plane, are coated with an amount of a liquid substance containing the matrix material. Methods to coat the fibers with a matrix material per se are known in the art and include contacting the fibers with a kiss roll with liquid matrix material. The advantage of this coating technique is that more rapid and better impregnation of the fibers is achieved. The liquid substance may be for example a solution, a dispersion or a melt of the plastic. If a solution or a dispersion of the plastic is used in the manufacture of the monolayer, the process also comprises evaporating the solvent or dispersant. In this way a monolayer is obtained. Subsequently the monolayers are stacked in such a way that the fiber direction in each monolayer is oriented at an angle (biased) with respect to the fiber direction in an adjacent monolayer. The stacked monolayers are thereafter given a treatment so that they are linked or attached to one another. A suitable treatment may be pressing or laminating the stack at a temperature sufficiently high to obtain adhesion. Generally a higher temperature will give a better adhesion. The adhesion may be further increased by applying some pressure. Suitable pressure and temperature can be found by some routine experimentation. In the event of high performance polyethylene fibers such temperature may for example not exceed 150° C.

The monolayers and/or sub-sheets according to the embodiments of the invention may suitably be piled up so as to form layers 12-1 and 12-2 and then compressed to form a ballistic resistant moulded article. With ballistic resistant moulded articles are meant shaped parts, comprising the monolayers and/or sub-sheets forming layers 12-1 and 12-2 which may be used as, for example, a panel for use in e.g. a radome, a vehicle, especially a curved panel, a hard insert e.g., for use in protective clothing and bullet resistant vests, helmets and the like. All these applications offer protection against ballistic impacts such as from bullets and ballistic fragments.

The piled up ballistic resistant sheets according to the embodiments of the invention may suitably be compressed at low pressures of between around 1 and 10 MPa, in an autoclave or a hydroclave. In such occasions, the earlier mentioned adhesive layer may suitably be used. Preferably, however higher pressures than 10 MPa are used. The piled up ballistic resistant sheets according to the embodiments of the invention may suitably be compressed at a pressure of more than 16.5 MPa (2393 psi), in a press or compression moulding machine. Preferably, the pressure is at least 20 MPa (2900 psi), or at least 25 MPa (3625 psi) since this further enhances ballistic resistance of the moulded article. According to some embodiments, the consolidation pressure can advantageously be 44.8 MPa (6500 psi) or more. Thus, consolidation pressures between about 16.5 MPa and about 45 MPa are usefully employed in forming consolidated panels from the hybrid ballistic sheets.

The temperature during the compression is preferably at least 100° C. and more preferably at least 110° C. The temperature during the compression is preferably between 125 and 150° C. A higher temperature has the advantage that the time of compression can be further reduced, but such higher temperature should stay preferably at least 10° C. below the temperature at which the mechanical properties of the fiber start to deteriorate, such as when the fiber starts to melt or loose mechanical properties as evidenced by a large decrease (at least 20% for any selected temperature) of strength as measured in a temperature controlled tensile test where strength of a fiber is measured at various temperatures. In the event of high performance polyethylene fibers the temperature should preferably not exceed 150° C., that is remain below the melting range of the fibers. By way of example, a stack of ballistic sheets wherein the face layers 12-2 comprise monolayers with a polyurethane matrix material may be compressed for at least 60 minutes at a temperature between 125 and 135° C. After pressing at elevated temperature, before removing from the press, the stack is cooled to a temperature below 100° C., preferably below 80° C. The stack may be cooled while still under pressure, preferably of at least 5 MPa, more preferably under the same pressure as in the preceding pressing step.

The embodiments described herein will be further understood from the following non-limiting examples thereof.

D. EXAMPLES

Example 1

A sheet comprised of three layers, i.e., face/core/face layers with each layer comprising monolayers cross-plied at an angle of 90° was formed generally in accordance with US 2010/0064404. The sheet was comprised of a core layer comprising monolayers (designated "X2") formed of UD polyethylene fibers (DYNEEMA® ultrahigh molecular weight polyethylene (UHMWPE)) having a tenacity of 3.9 GPa and a titer of 1 denier per filament with an elastomer matrix material (KRATON® styrene-isoprene-styrene block copolymer) with the core layer being sandwiched between respective face layers comprising monolayers (designated "X1") formed of the same UD polyethylene fibers as in the monolayers in the core but with a polyurethane matrix material (a polyurethane based on polyetherdiol and aliphatic diisocyanate (Baxenden Chemicals Ltd.)). The tensile modulus of the styrene-isoprene-styrene block copolymer and polyurethane matrix materials are 1.4 MPa and 6 MPa, respectively. This value is measured on strips of 100 mm length and 24 mm width made from films of the matrix material. The amount of the matrix materials in each of the core and face monolayers amounted to about 16.5 wt. % relative to the total weight of the respective monolayer.

The resulting sheet was a 20/60/20 weight percent by total sheet weight sandwich construction of X1/X2/X1 monolayers, respectively, and had an areal density of 10.25 kg/m² (2.1 lb/ft²). Respective panels identified as E1 and E2 were formed by consolidating the sheets under pressures of 16.5 MPa (2400 psi) and 44.8 MPa (6500 psi).

The said panels E1 and E2 were subjected to shooting test in accordance with the procedure set out in STANAG 2920. Specifically, a 7.62×39 mm Mild Steel Core (MSC) bullet, often also referred to as "AK47 MSC bullet", was used in the shooting test. The bullet was obtained from Messrs Sellier & Belliot, Czech Republic. These tests were performed with the aim of determining a ballistic performance, expressed as a V50 value for the consolidated sheets. V50 is the speed at which 50% of the projectiles will penetrate the consolidated stack of sheets. The testing procedure was as follows. The first projectile was fired at the anticipated V50 speed. The actual speed was measured shortly before impact. If the projectile was stopped, a next projectile was fired at an intended speed of about 10% higher. If it perforated, the next projectile was fired at an intended speed of about 10% lower. The actual speed of impact was always measured.

The V50 values of consolidated panels E1 and E2 were compared against panels having the same areal density but formed only of 100% X1 monolayers consolidated at the lower pressure of 16.5 MPa (2400 psi) and the higher pressure of 44.8 MPa (6500 psi). These panels made in comparative experiments were identified as CE1 and CE2, respectively. The results of this testing is shown in Table 1 below:

TABLE 1

| Example/<br>Comp.<br>Experiment | Construction | AD<br>(kg/m²) | Performance<br>Increase* |
|---|---|---|---|
| CE1 | 100% Monolithic X1 @ 16.5 MPa | 10.25 | 0% |
| CE2 | 100% Monolithic X1 @ 44.8 MPa | 10.25 | 8% |
| E1 | 20/60/20 X1/X2/X1 Hybrid @ 16.5 MPa | 10.25 | 6% |
| E2 | 20/60/20 X1/X2/X1 Hybrid @ 44.8 MPa | 10.25 | 20% |

*versus CE1

As can be seen from the data of Table 1 above, forming a hybridized panel in accordance with an embodiment of the invention resulted in a 6% V50 performance increase as compared to a monolithic sheet of comparable areal density (E1 vs. CE1). However, at the higher consolidation pressure, the hybridized panel in accordance with an embodiment of the invention resulted in a 20% V50 performance increase over the monolithic panel of comparable areal density consolidated at the lower pressure (E2 vs. CE1) and an extra 12% increase over the monolithic panel of comparable areal density consolidated at the same higher pressure (E2 vs. CE2). This significant difference in pressure response for the hybridized panel was not expected based on the pressure response of the monolithic panel formed of 100 wt. % X1 sheets when consolidated at the lower and higher pressures (CE2 vs. CE1). Furthermore this increase of V50 performance of the 3 layer hybrid X1/X2/X1 also proved larger than expected for a 2 layer hybrid, based on only X1/X2.

Example 2

Example 1 was repeated using hybridized sheets with reduced areal density of 9.27 kg/m² (1.9 lb/ft²) and consolidated the higher pressure of 44.8 MPa (6500 psi). One panel identified as E3 was formed with a 20/60/20 weight percent by total sheet weight sandwich construction of X1/X2/X1 monolayers, respectively, while another panel identified as E4 was formed with a 30/40/30 weight percent by total sheet weight sandwich construction of X1/X2/X1 monolayers, respectively.

The results of V50 ballistic performance testing according to STANAG 2920 using a 7.62×39 mm Mild Steel Core (MSC) bullet for panels E3 and E4 are shown in Table 2 below.

TABLE 2

| Experiment | Construction | AD<br>(kg/m²) | Performance<br>Increase* |
|---|---|---|---|
| E3 | 20/60/20 X1/X2/X1 Hybrid @ 44.8 MPa | 9.27 | 11% |
| E4 | 30/40/30 X1/X2/X1 Hybrid @ 44.8 MPa | 9.27 | 14% |

*versus CE1

As can be seen from the data of Table 2, with the lighter weight (lower areal density) panels designed according to the invention, consolidated at higher pressure, V50 performance increases of 11% and 14% can be achieved over a higher areal density monolithic construction consolidated at a lower pressure (E3 and E4 vs. CE1 (see Table 1)).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

The invention claimed is:

1. A ballistic resistant sheet in the form of a three-layer hybrid structure, comprising a core layer and face layers joined to respective opposing surfaces of the core layer, wherein the core layer comprises at least one first monolayer comprised of first unidirectionally (UD) oriented fibers and an elastomeric matrix material, and wherein each of the face layers comprise at least one second monolayer comprised of second UD oriented fibers and a non-elastomeric matrix material.

2. The ballistic resistant sheet according to claim 1, wherein the first and second UD fibers may be the same or different and are selected from organic fibers and inorganic fibers.

3. The ballistic resistant sheet according to claim 1, wherein at least one of the first and second UD fibers are formed of inorganic fibers selected from the group consisting of glass fibers, carbon fibers and ceramic fibers.

4. The ballistic resistant sheet according to claim 1, wherein at least one of the first and second UD fibers are formed of organic fibers selected from the group consisting of aromatic polyamide fibers, liquid crystalline polymer fibers, and ladder-like polymer fibers, polyolefin fibers, polyvinyl alcohol fibers, and polyacrylonitriles fibers.

5. The ballistic resistant sheet according to claim 4, wherein at least one of the first and second UD fibers are formed of ultra high molecular weight (UHMW) polyethylene fibers, polybenzimidazole fibers, poly(1,4-phenylene-2,6-benzobisoxazole fibers and poly(2,6-diimidazo[4,5-b-4', 5'-e]pyridinylene-1,4-(2,5-dihydroxy)phenylene) fibers.

6. The ballistic resistant sheet according to claim 1, wherein the matrix materials of the core and face layers are present in an amount of at most 20 mass % of the total mass of the sheet.

7. The ballistic resistant sheet according to claim 1, wherein the elastomeric matrix material has a tensile modulus of less than 3 MPa.

8. The ballistic resistant sheet according to claim 7, wherein the elastomeric matrix material is comprised of at least one selected from the group consisting of polybutadiene, polyisoprene, natural rubber, ethylene-propylene copolymers, ethylene-propylene-diene terpolymers, polysulfide polymers, polyurethane, polyurethane elastomers, modified polyolefins, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, thermoplastic elastomers, plastomers, and ethylene copolymers.

9. The ballistic resistant sheet according to claim 8, wherein the elastomeric matrix comprises a block copolymer of a conjugated diene and a vinyl aromatic monomer.

10. The ballistic resistant sheet according to claim 9, wherein the conjugated diene is butadiene or isoprene.

11. The ballistic resistant sheet according to claim 1, wherein the non-elastomeric matrix material has a tensile modulus of at least 3 M Pa or greater.

12. The ballistic resistant sheet according to claim 11, wherein the non-elastomeric matrix material is at least one selected from the group consisting of acrylates, polyurethanes, modified polyolefins and ethylene vinyl acetate.

13. A ballistic resistant article which comprises at least one sheet according to claim 1, consolidated at high temperature and pressure.

14. A ballistic resistant article according to claim 13, which is a three layered ballistic resistant article comprising the core layer and the two face layers, wherein the core layer comprises at least two of the first monolayers comprised of the first unidirectionally (UD) oriented fibers and the elastomeric matrix material, wherein the three layered ballistic resistant article exhibits a V50 of at least about 750 m/s according to Stanag 2920 using a 7.62×39 mm mild steel core bullet.

15. A method of making a ballistic resistant article which comprises consolidating at least one sheet according to claim 1 under an elevated pressure of at least about 16.5 MPa and an elevated temperature below a temperature at which mechanical properties of the first and second UD fibers deteriorate.

* * * * *